(12) United States Patent
Hur et al.

(10) Patent No.: US 7,910,827 B2
(45) Date of Patent: Mar. 22, 2011

(54) ADAPTER PLATE ASSEMBLY FOR OUTDOOR INSTALLATION OF NOTIFICATION APPLIANCES

(75) Inventors: Inhong Hur, Oakhurst, NJ (US); Scott Eric Rudolph, Lakewood, NJ (US); Luy Ba Nguyen, Colts Neck, NJ (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 12/725,250

(22) Filed: Mar. 16, 2010

(65) Prior Publication Data
US 2010/0171631 A1 Jul. 8, 2010

Related U.S. Application Data

(63) Continuation of application No. 11/752,091, filed on May 22, 2007, now Pat. No. 7,683,255.

(51) Int. Cl.
*H01H 9/02* (2006.01)
(52) U.S. Cl. .............. 174/53; 174/50; 174/58; 340/297; 361/642

(58) Field of Classification Search ............... 174/53, 174/58, 50, 51; 220/3.2, 4.02; 340/287, 340/297; 361/600, 627, 641–645
See application file for complete search history.

(56) References Cited

U.S. PATENT DOCUMENTS

| 3,137,763 | A | 6/1964 | Jones | |
|---|---|---|---|---|
| 3,288,910 | A | 11/1966 | Zerwes | |
| 3,576,937 | A | 5/1971 | Eldridge, Jr. | |
| 6,060,979 | A * | 5/2000 | Eichsteadt | 340/287 |
| 6,103,972 | A | 8/2000 | Hagarty | |
| 6,852,924 | B2 | 2/2005 | Lessard | |
| 7,642,458 | B2 * | 1/2010 | Stockton | 174/53 |
| 7,659,477 | B2 * | 2/2010 | Korcz et al. | 174/58 |
| 7,667,136 | B2 * | 2/2010 | Dinh et al. | 174/58 |
| 7,683,255 | B2 | 3/2010 | Hur et al. | |

* cited by examiner

*Primary Examiner* — Dhiru R Patel

(57) ABSTRACT

The present invention generally discloses a weatherproof flush adapter plate assembly. In one embodiment, the adapter plate assembly includes a plate. The plate includes a front side, a back side, an outer edge, at least one inner edge, at least one mounting member for receiving a back box and at least one mounting member for receiving a notification appliance. The adapter plate assembly also includes a first gasket coupled to the front side of the plate and a second gasket coupled to the back side of the plate.

20 Claims, 7 Drawing Sheets

ADAPTER PLATE ASSEMBLY FOR OUTDOOR INSTALLATION OF NOTIFICATION APPLIANCES

This application is a continuation of U.S. patent application Ser. No. 11/752,091, filed May 22, 2007 now U.S. Pat No. 7,683,255, which is currently allowed and is herein incorporated by reference in its entirety.

BACKGROUND OF THE INVENTION

1. Field of the Invention

The present invention relates to an apparatus that allows outdoor weatherproof installation of notification appliances without having the conduit run on the outside of a building. More specifically, the present invention provides an adapter plate for outdoor installation of notification appliances.

2. Description of the Related Art

Currently, some buildings are required by building code to have notification appliances on the outside. Notification appliances may be, for example, any visual alarms, audio alarms, speakers and the like. Notification appliances may be placed on the outside of buildings where people may be walking around outdoors, for example, outdoor eating areas, outdoor shopping malls, and the like.

Unfortunately when notification appliances are currently placed on the outside of a building, they are normally connected to a large back box and conduit carrying wiring to the notification appliance. The back box and conduit on the exterior of a building is undesirable because one may spend a great deal of resources to construct an appealing building that will attract patrons or for personal enjoyment, but the back box and conduit may be big, bulky and unattractive when deployed on the exterior of the building. Moreover, the conduit may run many feet along the exterior of the building and further detract from the aesthetic appeal of the building.

SUMMARY OF THE INVENTION

The present invention generally discloses an adapter plate assembly for outdoor notification appliances. In one embodiment, the adapter plate assembly comprises a plate, a first gasket coupled to a front side of said plate and a second gasket coupled to a backside of said plate. The plate comprises a front side, a back side, at least one mounting member for receiving a back box and at least one mounting member for receiving a notification appliance.

In an alternate embodiment, a notification appliance assembly is disclosed. The notification appliance assembly comprises an adapter plate assembly, a notification appliance and a back box. The adapter plate assembly comprises a plate, a first gasket coupled to said front side of said plate and a second gasket coupled to said back side of said plate. The plate comprises, a front side, a back side, at least one mounting member for receiving a back box and at least one mounting member for receiving said notification appliance. The notification appliance may be similar in geometry and perimeter dimensions as said plate and coupled to said front side of said plate, wherein said first gasket forms a substantially weatherproof seal between said front side of said plate and said notification appliance. The back box may be installed flush with an exterior side of a wall and coupled to said back side of said plate, wherein said second gasket forms a substantially weatherproof seal between said back side of said plate and said exterior side of said wall.

In another embodiment, the present invention provides a method of installing a notification appliance comprising installing a back box in a wall such that said back box is flush with an exterior side of said wall. Subsequently, the method couples an adapter plate assembly to said back box on said exterior side of said wall, thereby forming a substantially weather proof seal between a back side of said adapter plate assembly and said exterior side of said wall, wherein said adapter plate assembly comprises a plate, wherein said plate comprises at least one mounting member for receiving a notification appliance and at least one mounting member for receiving said back box, a first gasket coupled to a front side of said plate and a second gasket coupled to a back side of said plate. The method concludes by coupling a notification appliance to said adapter plate assembly, thereby forming a substantially weather proof seal between said front side of said plate and said notification appliance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

The present invention generally discloses an adapter plate assembly for outdoor notification appliances that can eliminate the need to mount unsightly back boxes and run unsightly conduits on the exterior walls of buildings. As discussed above, to maintain the aesthetic appeal of buildings, it is desirable to have a minimum number of parts protruding from or visible on exterior walls of buildings. However, by code, some buildings may be required to install notification appliances to the exterior walls of buildings. Notification appliances may be for example, audio alarms e.g., speakers, visual alarms e.g., strobe lights, or any combination thereof. The buildings may be commercial buildings that have outdoor patronage such as for example, outdoor eateries, outdoor shopping malls and the like. Therefore, maintaining the aesthetic appeal of the exterior of buildings may be important to attract a higher number of patrons or simply to promote the personal enjoyment of the building.

Figure 1:
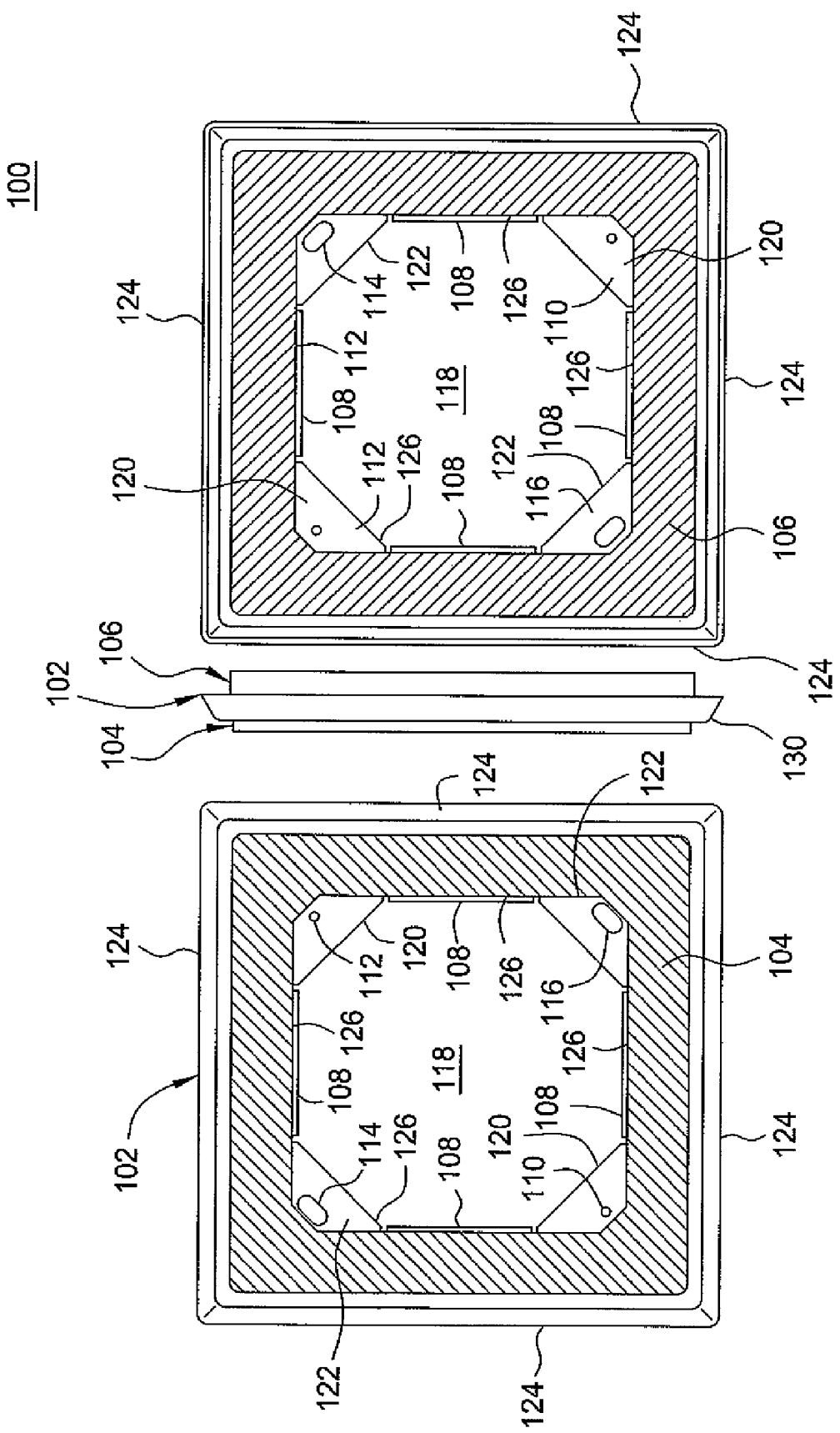
FIG. 1 is a front, back and side view of an exemplary adapter plate assembly of the present invention.

In one embodiment, FIG. 1 illustrates an adapter plate assembly 100 of the present invention. The adapter plate assembly 100 comprises a plate 102, a first gasket 104 coupled to a front side of the plate 102 and a second gasket 106 coupled to a back side of the plate 102. The plate 102 may be fabricated from steel, for example cold rolled steel (CRS). In an exemplary embodiment, 16 gauge CRS is used for fabricating plate 102 to a thickness of approximately 0.040 inches (in.) to 0.060 in.

The first gasket 104 and second gasket 106 are fabricated from any material suitable for use in outdoor applications that may withstand outdoor weather conditions, such as moisture, rain, wind and the like. For example, a suitable material may be monomers. In an exemplary embodiment of the present invention, the first gasket 104 and second gasket 106 may be fabricated from ethylene propylene diene monomer (EPDM) having a density of approximately 4 to 7 pounds per cubic foot ($lbs/ft^3$).

In an exemplary embodiment, the second gasket 106 is thicker than the first gasket 104. The second gasket 106 is thicker to allow the second gasket 106 to extend beyond a lip 130 of plate 102. Consequently, when the back side of plate 102 is coupled to a back box, the second gasket 106 may be compressed to form a weather proof seal. Exemplary dimensions of the first gasket 104 and the second gasket 106 are discussed below with reference to FIGS. 5 and 6.

The first gasket 104 and the second gasket 106 are coupled to the front side and back side, respectively, of plate 102 using an adhesive. In an exemplary embodiment, the adhesive may be any acrylic adhesive. Furthermore, the adhesive may be placed on the first gasket 104 and second gasket 106 with a "strip-off" adhesive. "Strip-off" adhesives may be any adhesive with a non-adhesive backing that may be removed to expose the adhesive on the gaskets. Consequently, during fabrication, the first gasket 104 and second gasket 106 may be directly applied to the plate 102 with the "strip-off" adhesive.

The plate 102 also includes guide members 108. The guide members 108 may be designed into the metal stamping of plate 102 and bent or formed to a 90 degree angle relative to the front side of plate 102. The guide members 108 help during metal stamping of plate 102 to provide the flattest surface possible. Alternatively, guide members 108 may be constructed onto plate 102 separately. The guide members 108 may be strategically placed along an inner edge 126 of plate 102. The guide members 108 help to ensure proper positioning of the first gasket 104 between the inner edge 126 and an outer edge 124 of plate 102.

The plate 102 also includes at least one mounting member 120 for receiving or mounting a notification appliance and at least one mounting member 122 for receiving a back box. In an exemplary embodiment, the plate 102 has two mounting members 120 for receiving a notification appliance and two mounting members 122 for receiving a back box, as illustrated in FIG. 1. Mounting members 120 may include tapped holes 110 and 112 for receiving a screw to couple plate 102 to a notification appliance. Mounting members 122 may include mounting holes 114 and 116 to couple plate 102 to a back box. Mounting holes 114 and 116 may be punched through in an oval or wider geometry than tapped holes 110 and 112 to provide a proper tolerance. One skilled in the art will recognize that the present invention is not limited to any specific number of mounting members 120 for receiving a notification appliance or mounting members 122 for receiving a back box. Any number of mounting members 120 and 122 sufficient to couple the plate 102 to a notification appliance or back box, respectively, are within the scope of the present invention. Furthermore, one skilled in the art will recognize that the positioning of mounting members 120 and 122 to receive a notification appliance or a back box, respectively, may be deployed in any position such as for example, a single gang, double gang or 4 inch position.

The plate 102 also comprises at least one opening 118. The opening 118 provides a passage for wiring from a conduit to be connected to a notification appliance coupled to the front side of plate 102. The opening 118 is formed by inner edges 126 of plate 102. Moreover, in an exemplary embodiment, opening 118 is deployed in a center of plate 102. One skilled in the art will recognize that plate 102 may have more than one opening 118 and the present invention is not limited to a single opening 118. For example, plate 102 may have multiple openings 118 to organize or separate specific wiring from the conduit. Moreover, one skilled in the art will recognize that opening 118 may be in any position relative to plate 102 to allow wiring to pass through the plate 102 from a conduit to a notification appliance coupled to the front side of plate 102.

Figure 2:
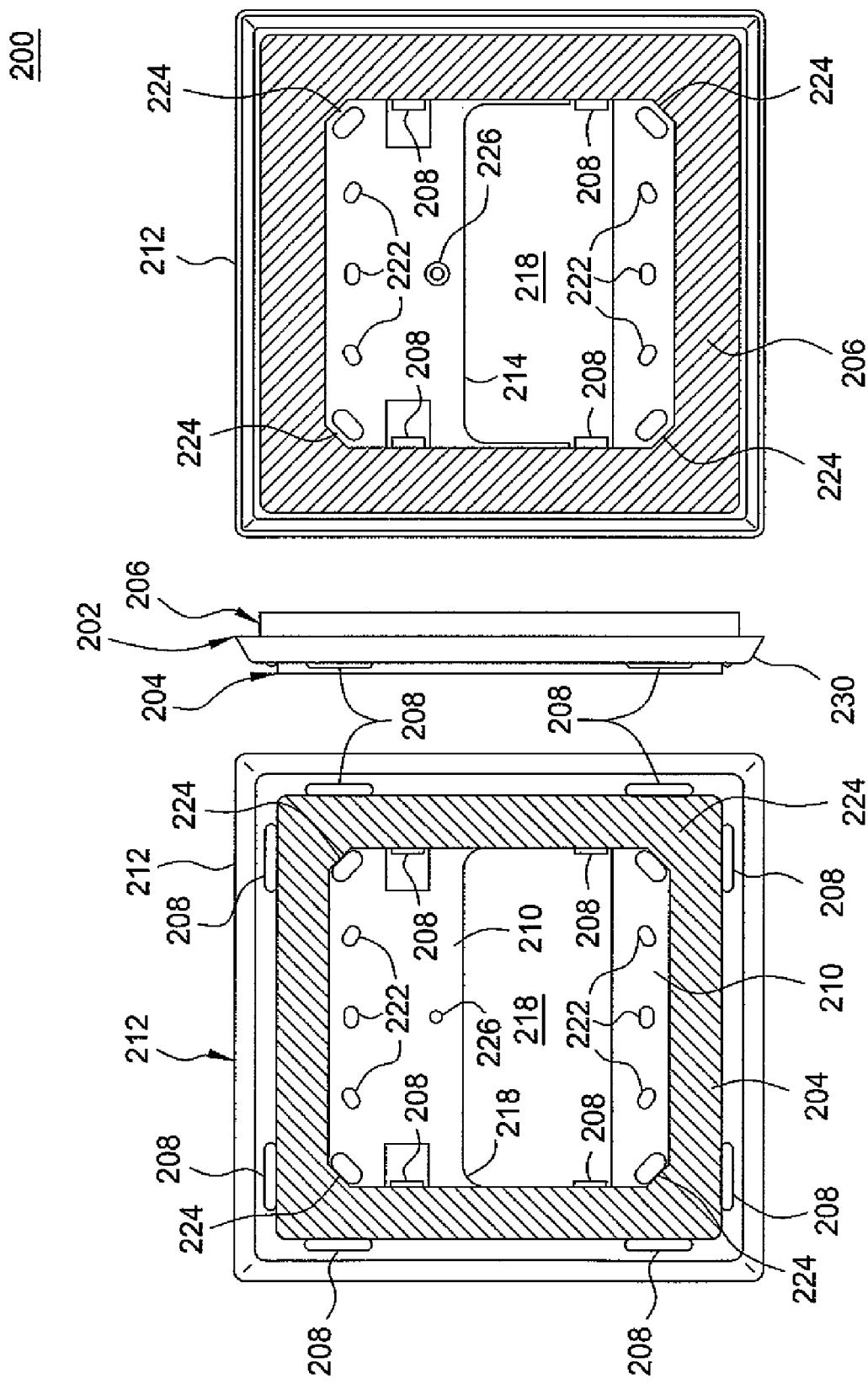
FIG. 2 is a front, back and side view of an alternate exemplary adapter plate assembly of the present invention.

An alternative adapter plate assembly 200 is illustrated in FIG. 2. The adapter plate assembly 200, similar to adapter plate assembly 100, comprises a plate 202, a first gasket 204 coupled to a front side of the plate 202 and a second gasket 206 coupled to a back side of the plate 202. The plate 202 may be fabricated from steel, for example cold rolled steel (CRS). In an exemplary embodiment, 16 gauge CRS is used for fabricating plate 202 to a thickness of approximately 0.040 in. to 0.060 in.

The first gasket 204 and second gasket 206 are fabricated from any material suitable for use in outdoor applications and that may withstand outdoor weather conditions, such as moisture, rain, wind and the like. For example, a suitable material may be monomers. In an exemplary embodiment of the present invention, the first gasket 204 and second gasket 206 may be fabricated from ethylene propylene diene monomer (EPDM) having a density of approximately 4 to 7 $lbs/ft^3$.

In an exemplary embodiment, the second gasket 206 is thicker than the first gasket 204. The second gasket 206 is thicker to allow the second gasket 206 to extend beyond a lip 230 of plate 202. Consequently, when the back side of plate 202 is coupled to a back box, the second gasket 206 may be compressed to form a weather proof seal. Exemplary dimensions of the first gasket 204 and the second gasket 206 are discussed below with reference to FIGS. 5 and 6.

The first gasket 204 and the second gasket 206 are coupled to the front side and back side, respectively, of plate 202 using an adhesive. In an exemplary embodiment, the adhesive may be any acrylic adhesive. Furthermore, the adhesive may be placed on the first gasket 204 and second gasket 206 with a "strip-off" adhesive. "Strip-off" adhesives may be any adhesive with a non-adhesive backing that may be removed to expose the adhesive on the gaskets. Consequently, during fabrication the first gasket 204 and second gasket 206 may be directly applied to the plate 202 with the "strip-off" adhesive.

The plate 202 also includes guide members 208. The guide members 208 may be designed into the metal stamping of plate 202 and bent or formed to a 90 degree angle relative to the front side of plate 202. The guide members 208 help during metal stamping of plate 202 to provide the flattest surface possible. Alternatively, guide members 208 may be constructed onto plate 202 separately. The guide members 208 may be strategically placed along an inner edge 214 of plate 202. The guide members 208 help to ensure proper positioning of the first gasket 204 between the inner edge 214 and an outer edge 212 of plate 202.

The plate 202 also includes at least one mounting member 210 for receiving or mounting a notification appliance and a back box. In an exemplary embodiment, the plate 202 has two mounting members 210 for receiving a notification appliance and a back box, as illustrated in FIG. 2. Mounting members 210 include at least one tapped hole 226 for receiving a screw to couple plate 202 to a notification appliance. In an exemplary embodiment, mounting members 210 include a single tapped hole 226 for receiving a notification appliance. Mounting members 210 also include at least one mounting hole 222 and at least one mounting hole 224 to couple plate 202 to a back box. In an exemplary embodiment, mounting members 210 may include multiple mounting holes 222 and multiple mounting holes 224 for receiving a back box. Multiple mounting holes 222 may be positioned such that plate 202 may be coupled to a back box in a single gang, double gang or 4 inch position. Mounting holes 224 may be punched through in an oval or wider geometry than mounting holes 222 to provide a proper tolerance. One skilled in the art will recognize that the present invention is not limited to any specific number of mounting members 210 for receiving a notification appliance and a back box. Any number of mounting members 210 sufficient to couple the plate 202 to a notification appliance or back box is within the scope of the present invention. Furthermore, one skilled in the art will recognize that the positioning of mounting members 210 to receive a notification appliance or a back box, respectively, may be in any position such as for example, a single gang, double gang or 4 inch position.

The plate 202 also comprises at least one opening 218. The opening 218 provides a passage for wiring from a conduit to be connected to a notification appliance coupled to the front side of plate 202. The opening 218 is formed by inner edges 214 of plate 202. Moreover, in an exemplary embodiment, opening 218 is in a center of plate 202. One skilled in the art will recognize that plate 202 may have more than one opening 218 and the present invention is not limited to a single opening 218. For example, plate 202 may have multiple openings 218 to organize or to separate specific wiring from the conduit. Moreover, one skilled in the art will recognize that opening 218 may be in any position relative to plate 202 to allow wiring to pass through the plate 202 from a conduit to a notification appliance coupled to the front side of plate 202.

Figure 3:
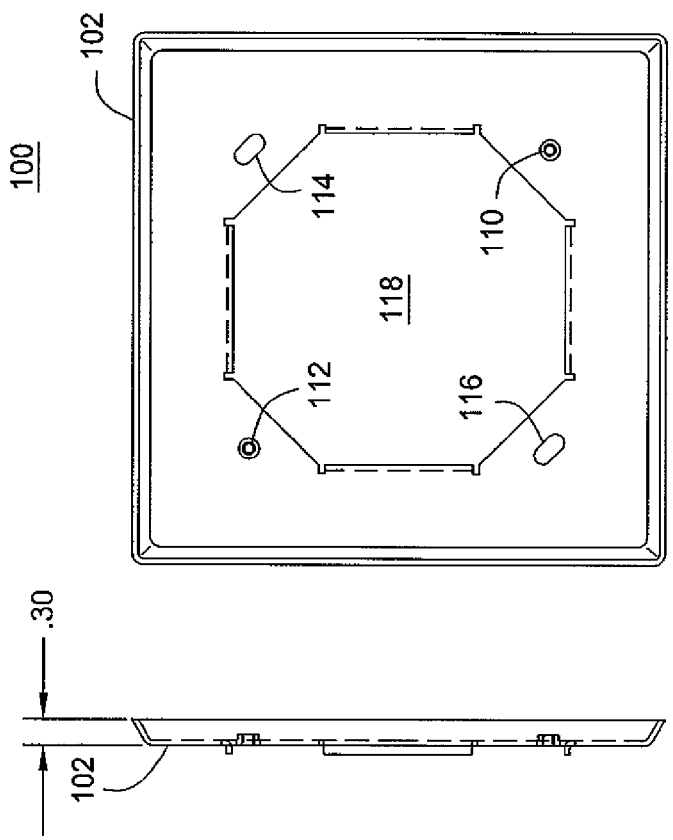
FIG. 3 is a front, back and side view of an exemplary plate of an exemplary adapter plate assembly of the present invention.
Figure 3:
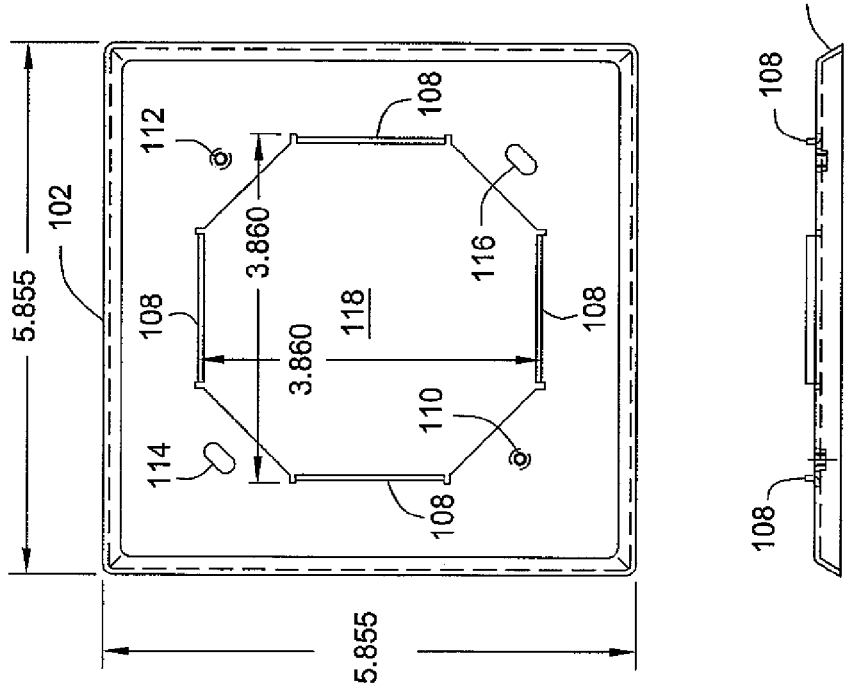
Figure 4:
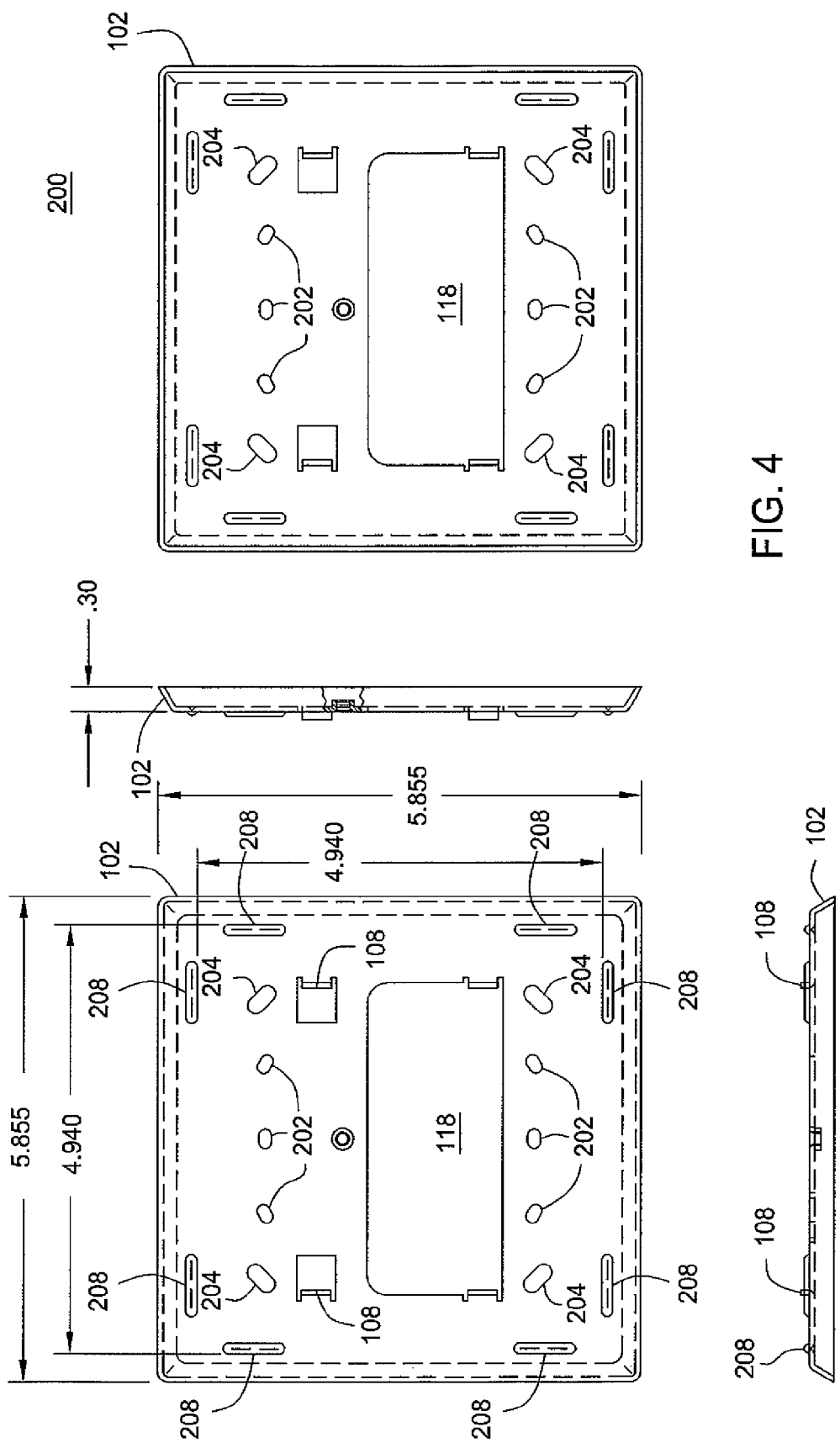
FIG. 4 is a front, back and side view of an alternate exemplary plate of an alternate exemplary adapter plate assembly of the present invention.

FIGS. 3 and 4 illustrate exemplary dimensions of plates 102 and 202, respectively. Plates 102 and 202 may comprise a square geometry each side measuring approximately 5 in. to 6 in. in length. One skilled in the art will recognize that plates 102 and 202 may be in any geometry or have any perimeter dimensions. However, to achieve the goal of maintaining aesthetic appeal on the exterior of a building, plates 102 and 202 should be fabricated to match the perimeter dimensions of a mounting base of a notification appliance in an exemplary embodiment.

In addition, plates 102 and 202 should be relatively flat. In an exemplary embodiment of the present invention, plates 102 and 202 have a flatness within approximately 0.015 to 0.025 inches Total Indicator Reading (TIR). The remaining dimensions of plates 102 and 202 are illustrated in FIGS. 3 and 4, respectively. The dimensions are provided only as examples and are not limiting in any way.

Figure 5:
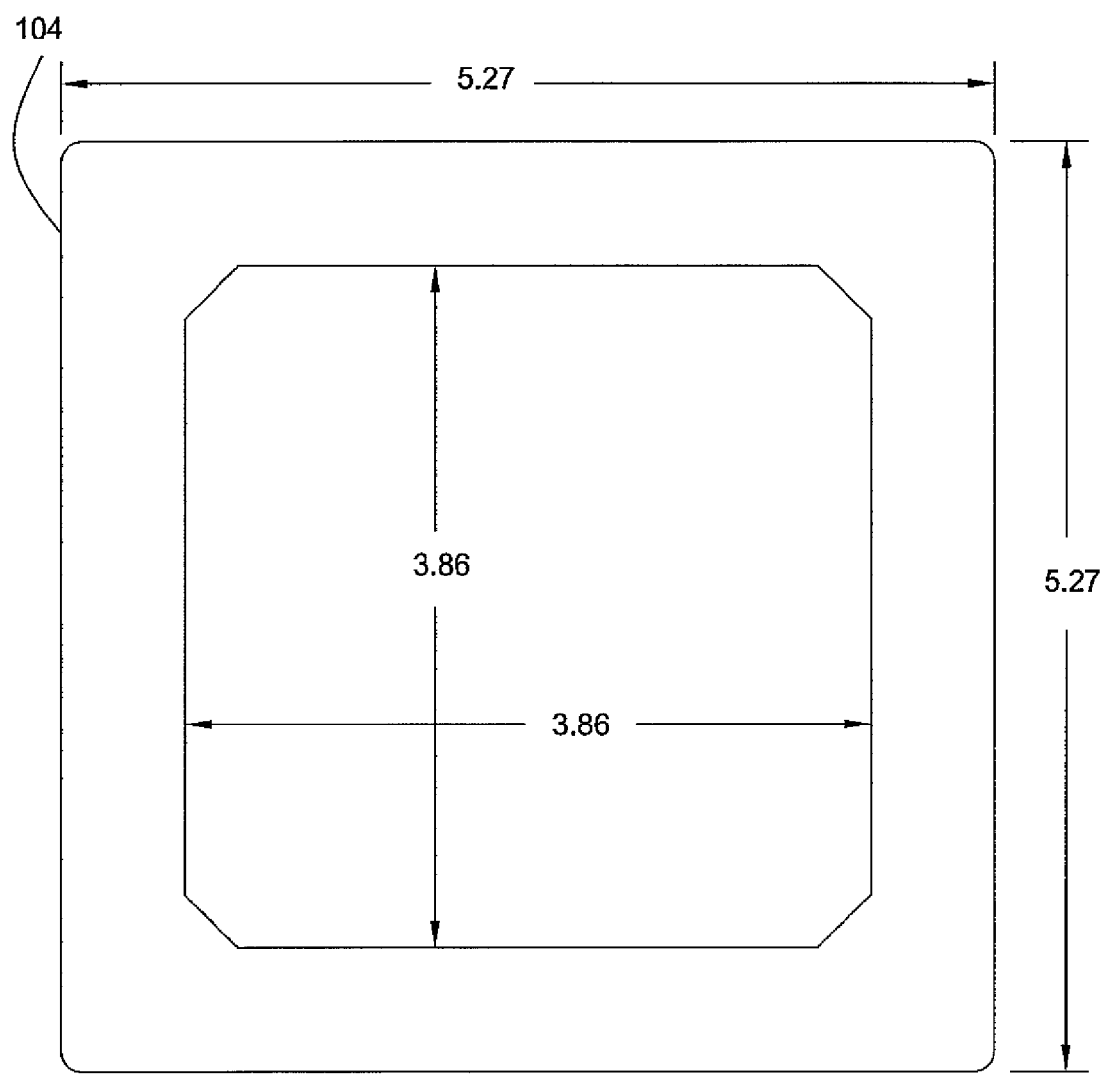
FIG. 5 is an engineering drawing of an exemplary front gasket of the present invention.

An exemplary embodiment of the first gasket 104 and 204 is illustrated in FIG. 5. The gasket illustrated in FIG. 5 will be generally referred to as first gasket 104, but is not intended to be limited to only first gasket 104. As noted above, the following discussion may equally apply to first gasket 204 of adapter plate assembly 200.

The first gasket 104 is generally shaped to match the geometry of plates 102, 202. In an exemplary embodiment, the first gasket 104 has a square geometry with each side being approximately 5 in. to 6 in. in length. The first gasket 104 may also have a center opening to correspond to the size and position of openings 118, 218 of plates 102, 202, respectively. The first gasket 104 is applied to the front side of plates 102, 202.

Furthermore, the first gasket 104 should have a thickness that is sufficient to create a weather proof seal between the plates 102, 202 and a notification appliance coupled to the front side of plates 102, 202. A weather proof seal is defined herein as preventing any weather element from entering the inside of the notification appliance or back box. Weather elements may be, for example, moisture, rain, snow, hail, excessive sun-light, wind and the like. The thickness of the first gasket 104 required to create a weather proof seal will be correlated to the properties of the material chosen to fabricate the first gasket 104. In an exemplary embodiment, the thickness is approximately 0.075 in. to 0.175 inches for a first gasket 104 fabricated from EPDM having a density of approximately 4 to 7 lbs/ft$^3$. When a notification appliance is coupled to the front side of plate 102, 202, the first gasket 104 may compressed to approximately half of the original thickness.

High ultra-violet (UV) resistance and low flammability may be optional features of the first gasket 104. For example, to prevent the inside of the notification appliance and back box from being exposed to excess sun-light, the material of the first gasket 104 should be rated for a high resistance to ultra-violet light. In addition, the material may have flammability standards that meet Underwriters Laboratories (UL) standards for certain applications, for example, UL code JMST2.

Figure 6:
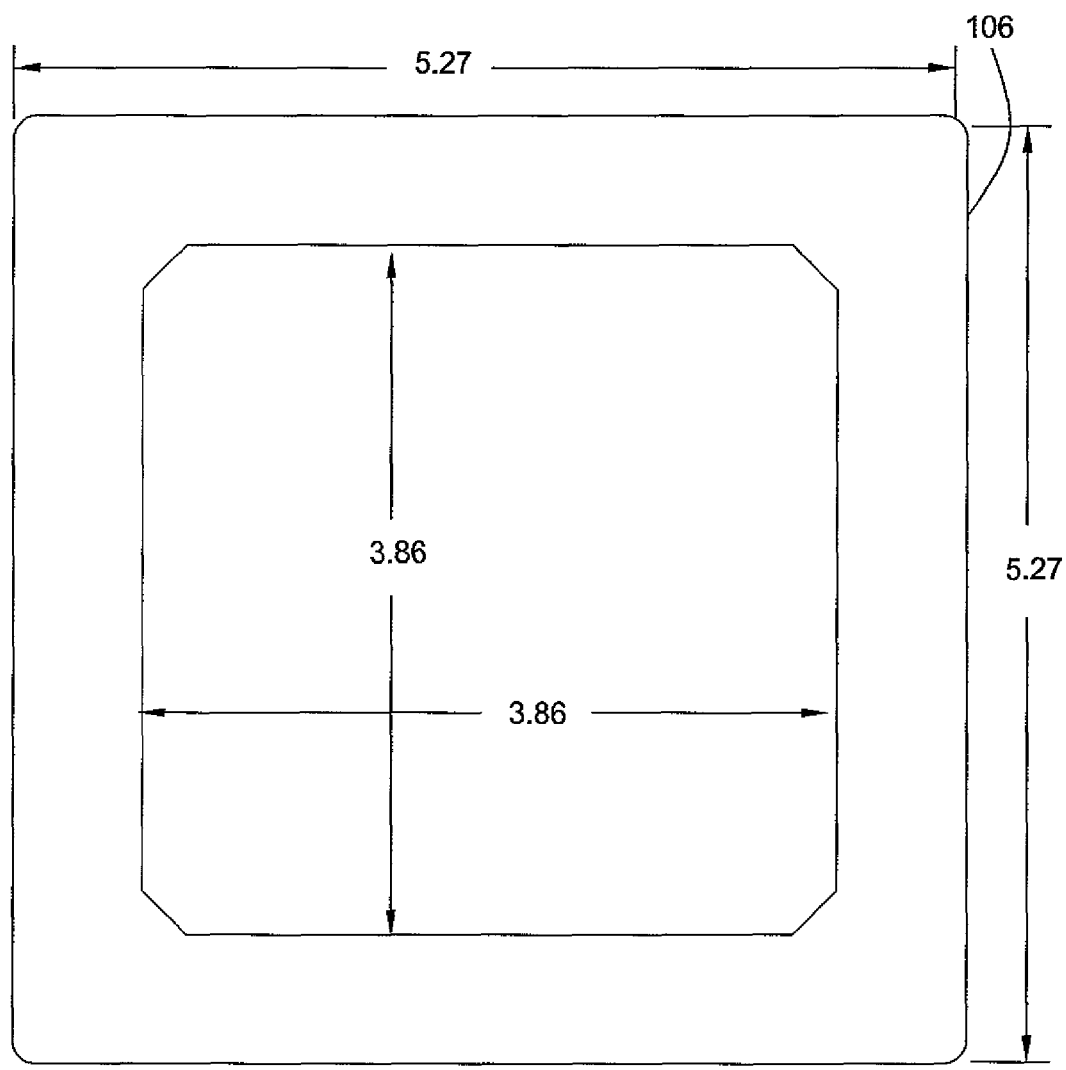
FIG. 6 is an engineering drawing of an exemplary rear gasket of the present invention.

An exemplary second gasket 106 and 206 is illustrated in FIG. 6. The gasket illustrated in FIG. 6 will be generally referred to as second gasket 106, but is not intended to be limited to only second gasket 106. As noted above, the following discussion may equally apply to second gasket 206 of adapter plate assembly 200.

The second gasket 106 is generally shaped to match the geometry of plates 102, 202. In an exemplary embodiment, the second gasket 106 has a square geometry with each side being approximately 5 in. to 6 in. in length. The second gasket 106 may also have a center opening to correspond to the size and position of openings 118, 218 of plates 102, 202, respectively. The second gasket 106 is applied to the front side of plates 102, 202.

Furthermore, the second gasket 106 should have a thickness that is sufficient to create a weather proof seal between the plates 102, 202 and a back box coupled to the back side of plates 102, 202. Also as noted above, the thickness of the second gasket 106 will be dependent on the dimensions of lip 130, 230 of plates 102, 202. The thickness of the second gasket 106 required to create a weather proof seal will be further correlated to the properties of the material chosen to fabricate the second gasket 106. In an exemplary embodiment, the thickness is approximately 0.400 in. to 0.600 in. for a second gasket 106 fabricated from EPDM having a density of approximately 4 to 7 lbs/ft$^3$. When the back side of plate 102, 202 is coupled to a back box and an exterior side of a wall, the second gasket 106 may be compressed to approximately half of the original thickness.

High ultra-violet (UV) resistance and low flammability may also be optional features of the second gasket 106. For example, to prevent the inside of the notification appliance and back box from being exposed to excess sun-light, the material of the second gasket 106 should be rated for a high resistance to ultra-violet light. In addition, the material may have flammability standards that meet Underwriters Laboratories (UL) standards for certain applications, for example, UL code JMST2.

Figure 7:
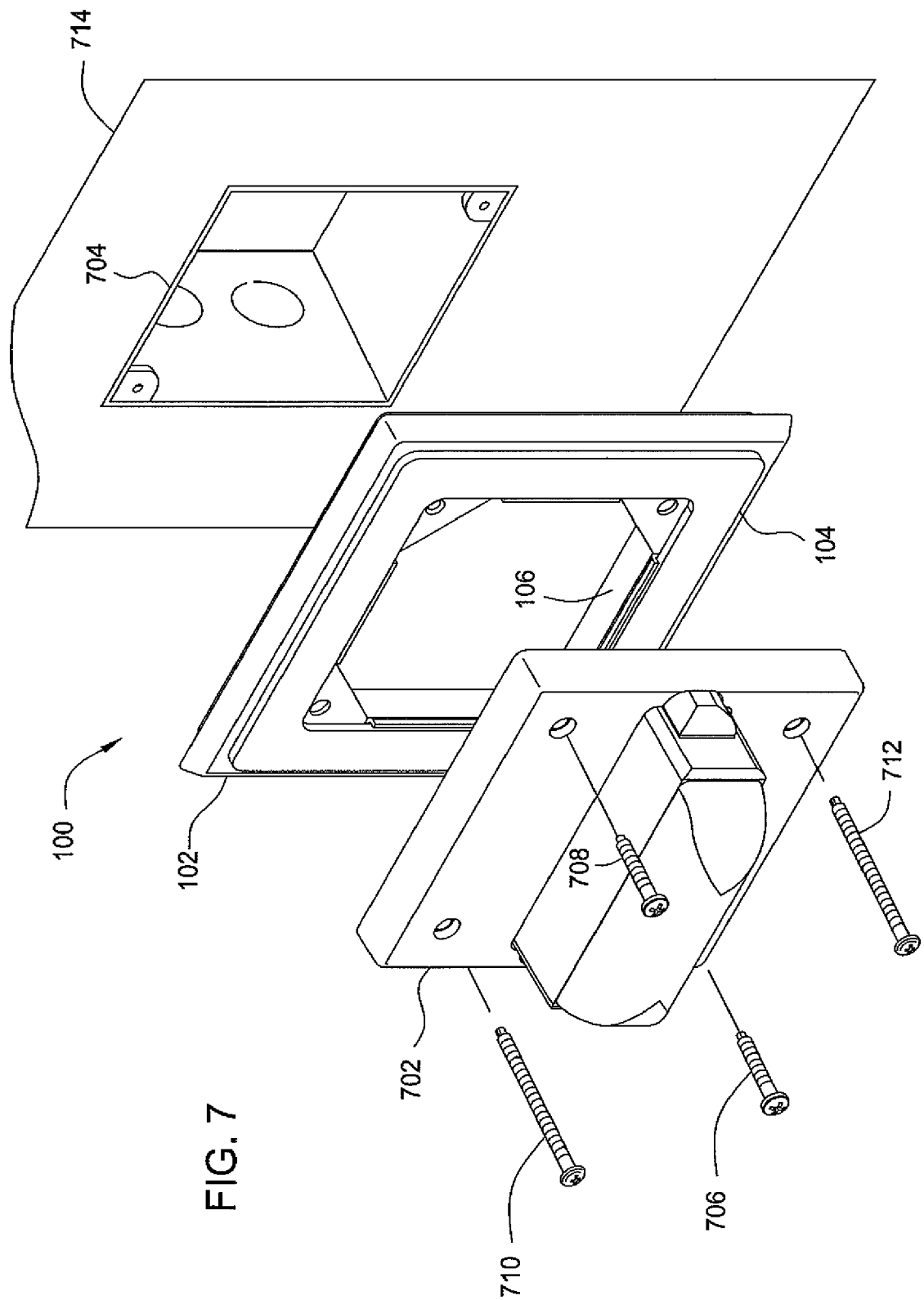
FIG. 7 is an exploded isometric view of an exemplary installation of an exemplary adapter plate assembly of the present invention.

An exemplary installation of the adapter plate assembly 100 of the present invention is illustrated in FIG. 7. One skilled in the art will recognize that adapter plate assembly 200 may be installed in a similar fashion. A back box 704 is installed into a wall 714. The wall 714 may be any exterior wall of any commercial or residential building or structure. Notably, the back box 704 is flush with an exterior side of wall 714. A conduit (not shown) is run on an interior side of wall 714 into back box 704. Consequently, the conduit and back box 704 cannot be seen from the exterior of the wall 714.

Subsequently, the back side of the plate 102 may be coupled to the back box 704 and a notification appliance 702 may be coupled to the front side of the plate 102 via screws 706, 708, 710 and 712. The back side of plate 102 lies flat against wall 714. The second gasket 106 forms a weather proof seal between the back side of plate 102 and the exterior side of wall 714 and the back box 704. The first gasket 104 forms a weather proof seal between the front side of plate 102 and the notification appliance 702.

An optional step may include caulking the edges of the back side of the plate 102 and the exterior side of wall 714. Caulking may further ensure that the seal between the back side of plate 102 and the exterior side of wall 714 is weather proof.

It should be noted that the present disclosure provides various numerical values that are only exemplary. Those skilled in the art will realize that other values may be applicable and thus, these exemplary values should not be viewed as a limitation of the present invention.

While the foregoing is directed to embodiments of the present invention, other and further embodiments of the invention may be devised without departing from the basic scope thereof, and the scope thereof is determined by the claims that follow.

What is claimed is:

1. An adapter plate assembly, comprising:
    a plate, wherein said plate comprises:
        a front side for receiving a notification appliance; and
        a back side for receiving a back box;
    a first gasket coupled to said front side of said plate; and
    a second gasket coupled to said back side of said plate, wherein said first gasket and said second gasket comprise a monomer, wherein said front side of said plate comprises a plurality of guide members for positioning said first gasket.

2. The adapter plate assembly of claim 1, wherein said notification appliance is coupled to said front side of said plate via at least one first mounting member and said back box is coupled to said back side of said plate via at least one second mounting member.

3. The adapter plate assembly of claim 1, wherein said plate comprises 16 gauge cold rolled steel having a thickness of about 0.040 inches to 0.060 inches.

4. The adapter plate assembly of claim 1, wherein said at least one mounting member for receiving said notification appliance is in a single gang, double gang or four inch position relative to said plate.

5. The adapter plate assembly of claim 1, wherein said second gasket has a greater thickness than said first gasket.

6. The adapter plate assembly of claim 1, wherein a thickness of said second gasket extends beyond a lip of said plate.

7. The adapter plate assembly of claim 1, wherein said monomer is ethylene propylene diene monomer (EPDM).

8. The adapter plate assembly of claim 7, wherein said first gasket comprises a thickness of about 0.075 inches to 0.175 inches and a density of about 4 pounds per cubic foot (lbs/ft$^3$) to 7 lbs/ft$^3$.

9. The adapter plate assembly of claim 7, wherein said second gasket comprises a thickness of about 0.400 inches to 0.600 inches and a density of about 4 pounds per cubic foot (lbs/ft$^3$) to 7 lbs/ft$^3$.

10. The adapter plate assembly of claim 1, wherein said first gasket and said second gasket are coupled to said plate via an acrylic adhesive.

11. A notification appliance mounting assembly, comprising:
    an adapter plate assembly, wherein said adapter plate assembly comprises:
        a plate, wherein said plate comprises:
            a front side for receiving a notification appliance; and
            a back side for receiving a back box;
        a first gasket coupled to said front side of said plate, wherein said front side of said plate comprises a plurality of guide members for positioning said first gasket; and
        a second gasket coupled to said back side of said plate, wherein said first gasket and said second gasket comprise a monomer;
    said notification appliance; and
    a back box.

12. The notification appliance mounting assembly of claim 11, wherein said notification appliance is coupled to said front side of said plate via at least one first mounting member and said back box is coupled to said back side of said plate via at least one second mounting member.

13. The notification appliance mounting assembly of claim 11, wherein said plate comprises 16 gauge cold rolled steel (C.R.S.) having a thickness of about 0.040 inches to 0.060 inches.

14. The notification appliance mounting assembly of claim 11, wherein said second gasket has a greater thickness than said first gasket.

15. The notification appliance mounting assembly of claim 11, wherein a thickness of said second gasket extends beyond a lip of said plate.

16. The notification appliance mounting assembly of claim 11, wherein said monomer is ethylene propylene diene monomer (EPDM).

17. The notification appliance mounting assembly of claim 16, wherein said first gasket comprises a thickness of about 0.075 inches to 0.175 inches and a density of about 4 pounds per cubic foot (lbs/ft$^3$) to 7 lbs/ft$^3$.

18. The notification appliance mounting assembly of claim 16, wherein said second gasket comprises a thickness of about 0.400 inches to 0.600 inches and a density of about 4 pounds per cubic foot (lbs/ft$^3$) to 7 lbs/ft$^3$.

19. The notification appliance mounting assembly of claim 11, wherein said first gasket and said second gasket are coupled to said plate via an acrylic adhesive.

20. A method of installing a notification appliance comprising:
    installing a back box in a wall such that said back box is flush with an exterior side of said wall;
    coupling an adapter plate assembly to said back box on said exterior side of said wall, thereby forming a substantially weather proof seal between a back side of said adapter plate assembly and said exterior side of said wall, wherein said adapter plate assembly comprises a plate, wherein said plate comprises a front side for receiving a notification appliance and a back side for receiving said back box, a first gasket coupled to said front side of said plate and a second gasket coupled to said back side of said plate, wherein said first gasket and said second gasket comprise a monomer, wherein said front side of said plate comprises a plurality of guide members for positioning said first gasket; and coupling a notification appliance to said adapter plate assembly, thereby forming a substantially weather proof seal between said front side of said plate and said notification appliance.

* * * * *